Oct. 2, 1928.
C. L. ZABRISKIE
1,686,309
LUBRICATING DEVICE
Filed April 13, 1926
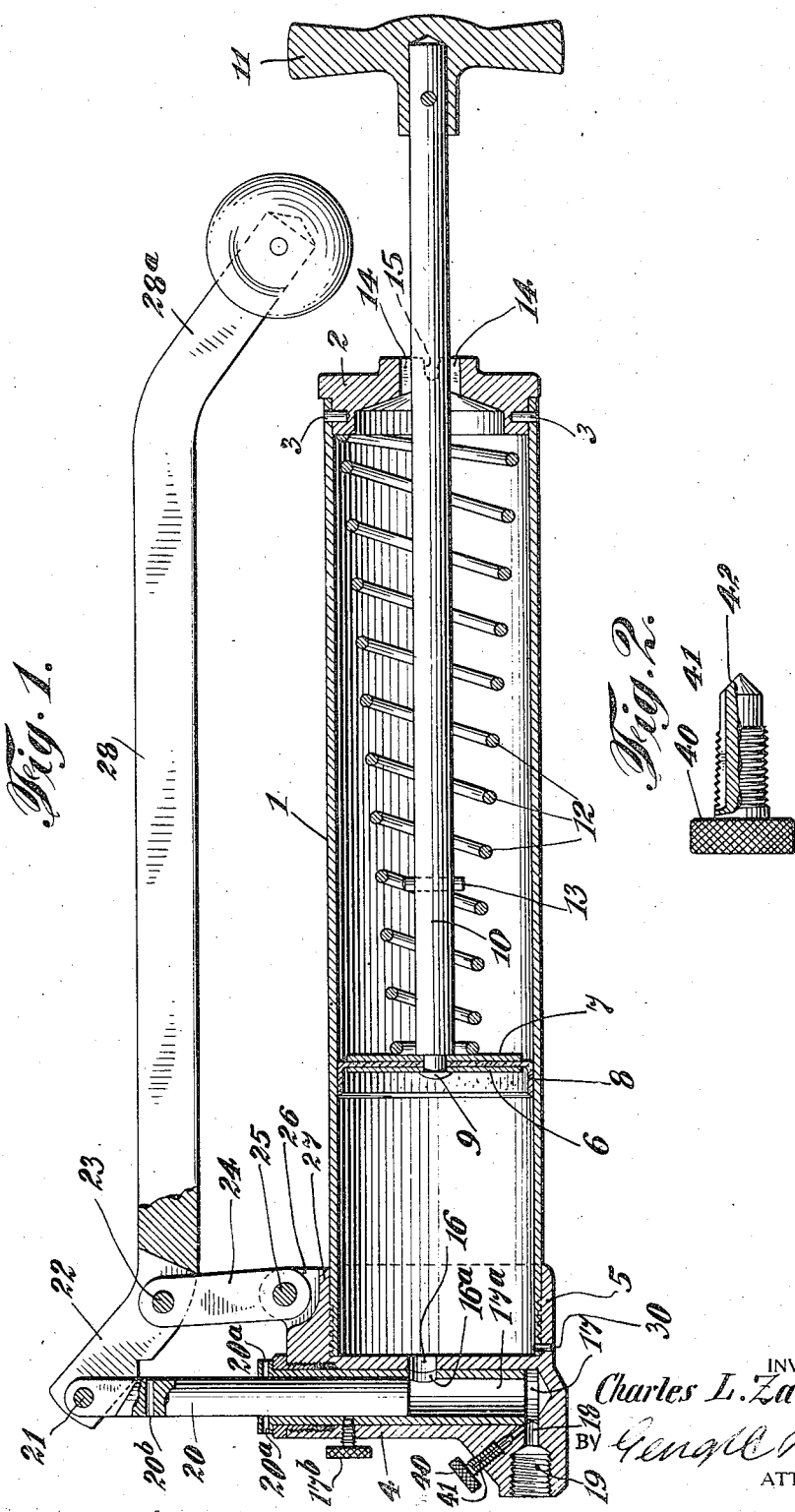
INVENTOR
Charles L. Zabriskie
BY
ATTORNEY Patented Oct. 2, 1928.

1,686,309

UNITED STATES PATENT OFFICE.

CHARLES L. ZABRISKIE, OF NEW YORK, N. Y., ASSIGNOR, BY MESNE ASSIGNMENTS, TO ROGERS PRODUCTS CO., INC., A CORPORATION OF NEW JERSEY.

LUBRICATING DEVICE.

Application filed April 13, 1926. Serial No. 101,652.

My present invention relates to apparatus of the type shown in my application, Ser. No. 84,101, filed January 27th, 1926, in that it is designed for use as a hand operated grease gun for forcing grease through the ducts of bearings on automobiles and other machinery, particularly in cases where the duct inlets are normally closed by ball inlet check valves, as in recently expired British patent to Alley and Woodvine, No. 21,893, of 1906; Oct. 4.

More specifically considered, the object is to combine in a relatively small hand-operated grease gun, the features of force feed reservoir adapted to be charged with enough grease for lubricating many ducts, in combination with a plunger pump into the intake of which the reservoir discharges at moderate pressure, the pump being conveniently located for hand operation to overcome resistance encountered. This resistance is often great, as where the check valve fittings or ducts have become clogged with hardened grease or dirt, yet if the piston area of the pump is made great enough to overcome the maximum resistance that is sometimes encountered, its capacity will be inconveniently small for average conditions where substantial amounts of lubricant are to be pumped against moderate resistance.

For these and other reasons, my present improvements include making the piston area so large that the "per-square-inch" pressures will be only sufficient for average work, while the volume of lubricant pumped by each stroke of the piston will be correspondingly large but such relatively large piston area is afforded by a plurality of longitudinally slidable sections. One of these, which may be called the main piston, is directly secured to the reciprocating means and always functions as a piston, while the other section, though normally secured to and operating as supplemental section of said main piston, is releasable, so that it can be secured within and function as part of the cylinder.

While the principle may be embodied in various forms, I prefer to have the main piston a cylindrical plunger and the supplemental section in the form of a cylindrical jacket slidably fitting the exterior of the plunger and the interior of the cylinder, so that it may be readily secured either as a small diameter liner for the cylinder or as a diameter increasing jacket for the plunger. The cross-sectional areas of the main plunger and the transferable section may have any desired size and ratio.

In the preferred form, said transferable section is longer than the cylinder and the exteriorly projecting portion is preferably utilized for securing it either in the cylinder or upon the piston.

My present device also embodies prior features shown in my prior application, as, for instance, the grease reservoir is in the form of a cylinder of considerable length, the pump handle is of the same or slightly greater length, and the fulcrum with the lever is arranged in such relation to the pump plunger and to the operating handle, that the force stroke of the pump plunger is accomplished by a separating movement of the reservoir cylinder, which will be grasped by the left hand, and the pump handle, which will be grasped by the right hand, or vice versa.

The above and other features of my invention will be more evident from the following description in connection with the accompanying drawings, in which Fig. 1 is a longitudinal section in a plane including the axis of the reservoir and also the axis of the pump chamber; and Fig. 2 is a detail side elevation partly in longitudinal section.

The reservoir comprises the cylinder, 1, closed, preferably permanently, by flange closing plug, 2, secured by pin rivets, 3, 3. The other end of the reservoir cylinder is closed by fitting, 4, having an internally screw-threaded flange, 5, engaged by an exterior thread on the end of the cylinder 1.

The means for applying pressure on the grease in the cylinder is shown as comprising a piston, which may consist simply of discs, 6, 7, between which is clamped the body portion of a cup washer, 8, as by riveting the head, 9, of the piston guide-rod, 10, which extends through the rear closure, 2, and may be provided with a handle, 11. The piston may have pressure applied to it in any desired way, as by spiral spring, 12, the resilience of which will be designed to normally force the piston to the extreme position where all of the grease has been expelled through the fitting, 4. Preferably, the piston rod, 10, is provided with a cross-pin, 13, adapted to be withdrawn through slots, 14, to fully retract the piston against the pressure of the spring. The piston and spring may be held in a retracted position by rotating the rod, 10, to bring the pin, 13, out of registry with slots, 14, and, if desired, notches, 15, may be formed in a boss in the rear end of closure, 2, in which the pin, 13, may be seated and held from displacement by the pressure of the compressed spring. In this position, the handle, 11, may be used as a wrench to unscrew the cylinder from the fitting, 4. Grease may be then charged in through the open end of the detached cylinder, and thereafter the cylinder may be again screwed to position and the piston released by rotating the rod, 10, to permit the pins to pass through the slots, 14, under the influence of the spring, 12. Thereafter, the spring will apply substantial pressure for feeding the grease and this may be supplemented by further hand pressure through the handle, 11. In this way, a pressure supply of grease is maintained on the intake 16, 16$^a$, of the pump.

The pump comprises a cylindrical bore, 17, formed in the casting, 4, with its axis at right angles to the axis of the reservoir, the outlet being through passage, 18, which may discharge through any suitable coupling member that may be screwed into the nozzle, 19. The pump plunger, 20, is shown as approximately the same size as in my prior application and the piston area thereof will be small enough to afford the maximum forcing pressure desired for overcoming exceptionally high resistance in the fittings or ducts that are to be lubricated. This plunger engages with a liner, 17$^a$, slidably fitting the bore, 17, and arranged to be detachably secured therein by any suitable means, as for instance, screw, 17$^b$. For ordinary working against moderate resistance however, the screw 17$^b$ is disengaged and the transverse perforations, 20$^a$, in the projecting end of the liner are brought in registry with the transverse passage, 20$^b$, in plunger 20, and there secured by a transverse pin or bolt. In the latter relation, the liner, 17$^a$, functions as an integral part of the plunger and the larger bore, 17, functions as the cylinder. Obviously, the sizes and relative areas of the liner 17$^a$ and the piston 20, may be varied within wide limits. The smaller the piston 20, the greater the available pressures and the less the quantity of grease that will be pumped at each stroke, and the larger the liner 17$^a$ is relative to the piston, the more extensively will the volume of the pump be increased and the power decreased.

The plunger, 20, is connected by pivot, 21, with fork lever arm, 22, fulcrumed on pivot, 23, link, 24 and pivot 25 by which the link is secured between suitable guiding faces 26, in an extension, 27, of fitting, 4. The long power arm of the lever, 28, preferably has its hand grasp end, 28$^a$, curved toward the reservoir cylinder, 1, so that as the plunger approaches the end of a feeding stroke, said handle becomes more nearly parallel with the cylinder which forms a cooperating hand grasp for forcibly reciprocating the pump. Preferably, the handle is stopped at approximate parallelism with the cylinder, 1, by the base of the fork at 28$^a$ engaging link 22.

It is of great advantage to have the high power forcing movement of the pump such that it may be applied by pulling the end of the handle, 28, away from the end of cylinder, 1. It will be found in practice that much greater power can be applied by such a "pull apart movement" than where the operator has to apply the power by forcing his hands toward each other. There is the further advantage that "pull-apart" stresses are naturally diametric and have no tendency to produce a rotary resultant, whereas attempts to apply great pressure by pushing one hand toward the other hand, frequently results in getting the opposing pressure enough out of line with each other so that a very sudden and extreme rotation of the handle about the axis of the coupling at 19 is caused, thus unscrewing or loosening the detachable coupling through which the grease pressure takes effect.

In the position of parts shown in the drawings, grease under such pressure will flow freely through pump intake, 16, into pump cylinder, 17, and out through pump outlet, 18, for discharge through any suitable coupling member that may be screwed into the nozzle, 19. Such reservoir feed of grease may be stopped at any time either by advancing the pump plunger, 20, until the inlet port, 16, is covered thereby or by retracting the piston as described above.

It is to be noted that while the detachable coupling may be a rigidly projecting nozzle screwed directly into outlet 19, I prefer to have it on the end of a flexible metallic hose.

The vent, 30, at the base of the screw flange, 5, is adapted to be opened by unscrewing the cylinder, 1, a short distance, say, one or two threads, and can be completely sealed again by screwing the cylinder back to the position shown in Fig. 1. This is a feature of considerable practical importance, because in initially filling the cylinder with grease through its open end, with the piston retracted, or upon retracting the piston to relieve the grease from the pressure of spring, 12, considerable amounts of air may be trapped in the cylinder with the grease. It is highly desirable to expel the air before applying the implement to an automobile fitting so as to make certain that in operation the pump plunger, 20, will be operating to force solid grease rather than air into the duct which is being lubricated, but all of the air trapped in the grease in cylinder 1 can easily be forced out through the vent, 30, with little or no loss of grease, and the operation is automatically accomplished by the pressure of the spring whenever the cylinder, 1, is unscrewed the turn or two necessary to uncover the vent, 30.

The air trapped in the base of the pump cylinder may be vented after the device has been applied to a duct to be lubricated, by unscrewing a vent screw, 40, provided with a vent groove, 41, which will permit escape of the air as soon as the valve face, 42, is retracted out of contact with the valve seat.

I claim:—

1. A grease gun, including reservoir, a force pump having main piston and cylinder elements, and means for relatively reciprocating them, in combination with a transferable piston and cylinder element of substantial cross-sectional area with a surface axially slidable along a corresponding surface of the piston element and having one end extending beyond one end of said main cylinder; means for locking said exterior end of said transferable element to function as effective cross-sectional area, with the piston element, and other means extending through the cylinder wall for locking it to function with the cylinder element.

2. A grease gun, including a force pump having piston and cylinder elements, means for relatively reciprocating them and means for feeding grease into said pump, said piston having a substantial portion of its effective cross-sectional area afforded by a slidable element having rigid therewith an element extending outside of the main cylinder and means operable from the exterior of the gun whereby said slidable element may be secured to or detached from the piston element.

3. A grease reservoir of relatively large capacity and a force pump with its intake arranged to receive grease from said reservoir, said pump including a cylinder and a main piston element of smaller cross-sectional area than the cylinder and having one end extending outside the gun, in combination with a supplemental, longitudinally slidable piston element also extending outside of the gun and means outside of the gun whereby said outside portion of said slidable element may be detachably secured to the outwardly extending end of said main piston to function therewith, or detached to remain stationary and function with the main cylinder.

4. A grease gun, including a force pump having exteriorly extending piston and cylinder elements, means for relatively reciprocating them and means for feeding grease into said pump, said piston and cylinder elements including a shiftable element of substantial cross-sectional area, fitting and axially slidable on the exterior of the piston element and also fitting and axially slidable within the cylinder element, exterior securing means whereby said shiftable element may be locked to the piston element and other means for locking it to the cylinder element to function as effective cross-sectional area, either with the piston element or with the cylinder element.

5. A grease gun, including a grease reservoir, an outlet and means for forcing the grease towards said outlet, in combination with relatively a small area main piston and a cylinder of larger diameter, and a shiftable tubular element slidably fitting between the piston and cylinder, said piston and shiftable element both projecting outside of the gun and there provided with means whereby they may be secured to function as a unit or detached so that only the main piston element functions as such.

6. A cylindrical grease reservoir having pressure applying means at one end, at the other end, a closure carrying a force pump arranged transversely to the axis of the reservoir and having a lateral intake arranged to receive grease from said reservoir, said pump including a cylinder and a main piston having a cross-sectional area smaller than that of the cylinder, in combination with a transferable piston element consisting of a tubular member slidably fitting both the exterior of the piston and the interior of the cylinder having a lateral intake opening corresponding to said intake from the reservoir; means whereby it may be secured as jacket forming part of the piston or as a liner forming part of the cylinder, with said intakes in registry.

7. A cylindrical grease reservoir having pressure applying means at one end and, at the other end, a closure carrying a force pump arranged transversely to the axis of the reservoir and having a lateral intake arranged to receive grease from said reservoir, said pump including a cylinder and a main piston having a cross-sectional area smaller than that of the cylinder, in combination with a transferable piston element consisting of a tubular member slidably fitting both the exterior of the piston and the interior of the cylinder; means whereby it may be secured as jacket forming part of the piston or as a liner forming part of the cylinder; said tubular element having a lateral opening adapted to register with the inlet from the reservoir when said element is secured to operate as a liner for the cylinder.

8. A grease gun, including pressure feed reservoir, a single acting force pump having a lateral intake, receiving grease from said reservoir including a cylinder and a cylindrical piston plunger extending beyond the end of said cylinder, in combination with a transferable tubular member fitting both the exterior of the piston and the interior of the cylinder, extending along the piston to a point outside of the cylinder; means for limiting the extent to which said tubular member may slide; means whereby said exterior portion of the tubular member may be secured to the piston; and means extending through the cylinder wall for locking said slidable member to the cylinder.

Signed at New York, in the county of New York and State of New York, this 9th day of April, A. D. 1926.

CHARLES L. ZABRISKIE.